Sept. 12, 1967 W. H. HITTENBERGER ETAL 3,340,777
MACHINES FOR BONDING, BY HEAT AND PRESSURE, PANELS OF
PAPERBOARD HAVING A THERMOPLASTIC COATING THEREON
Filed Feb. 25, 1965 9 Sheets-Sheet 1

INVENTOR.
William H. Hittenberger
Thomas R. Baker
BY
Howard G. Russell
their ATTORNEY Sept. 12, 1967   W. H. HITTENBERGER ETAL   3,340,777
MACHINES FOR BONDING, BY HEAT AND PRESSURE, PANELS OF
PAPERBOARD HAVING A THERMOPLASTIC COATING THEREON
Filed Feb. 25, 1965   9 Sheets-Sheet 2

INVENTOR.
William H. Hittenberger
Thomas R. Baker
BY Howard G. Russell
their ATTORNEY Sept. 12, 1967  W. H. HITTENBERGER ETAL  3,340,777
MACHINES FOR BONDING, BY HEAT AND PRESSURE, PANELS OF
PAPERBOARD HAVING A THERMOPLASTIC COATING THEREON
Filed Feb. 25, 1965  9 Sheets-Sheet 4

INVENTOR.
William H. Hittenberger
Thomas R. Baker
BY Howard G. Russell
their ATTORNEY INVENTOR.
William H. Hittenberger
Thomas R. Baker
BY
Howard G. Russell
their ATTORNEY INVENTOR.
William H. Hittenberger
Thomas R. Baker
BY
Howard G. Russell
their ATTORNEY

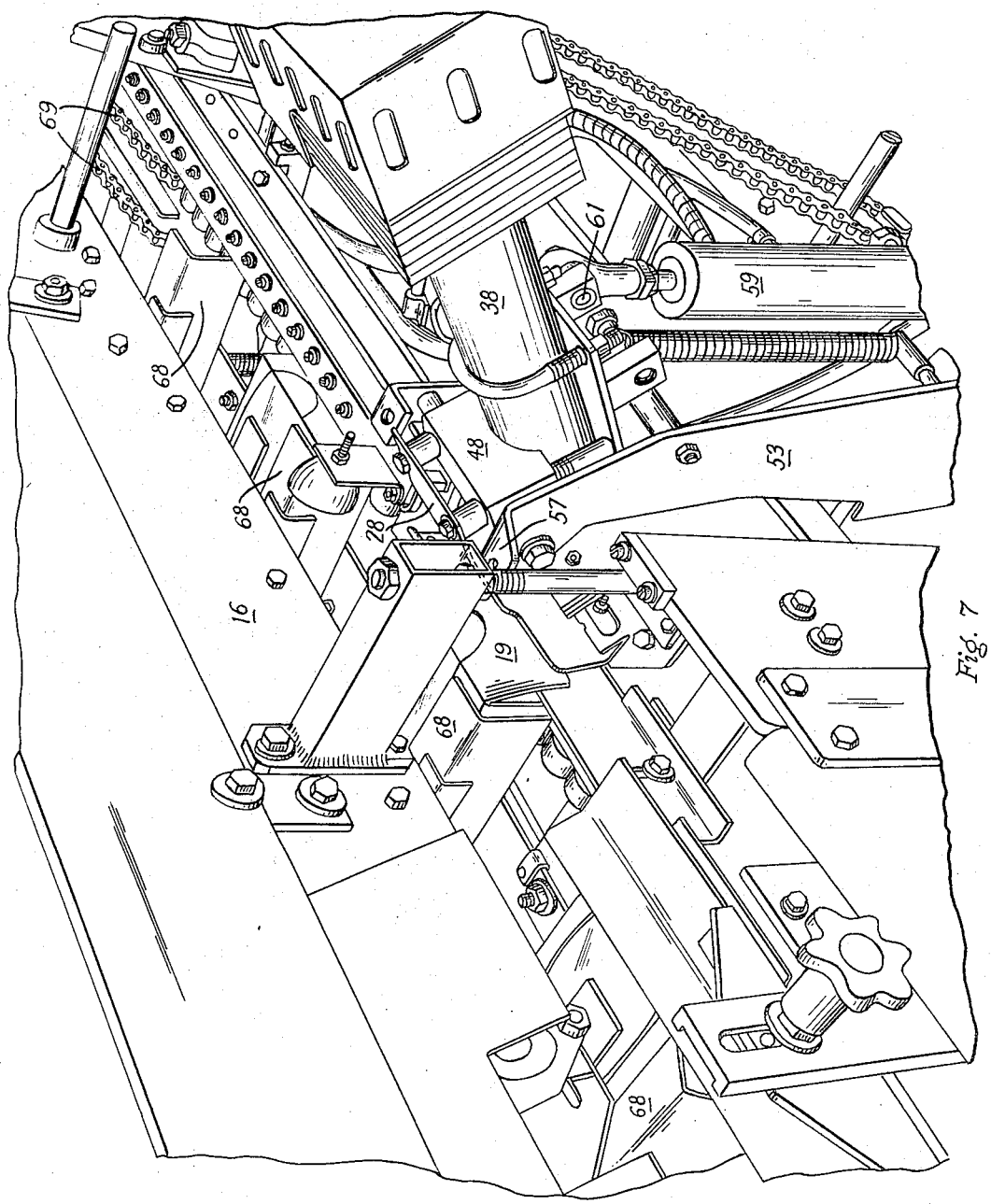

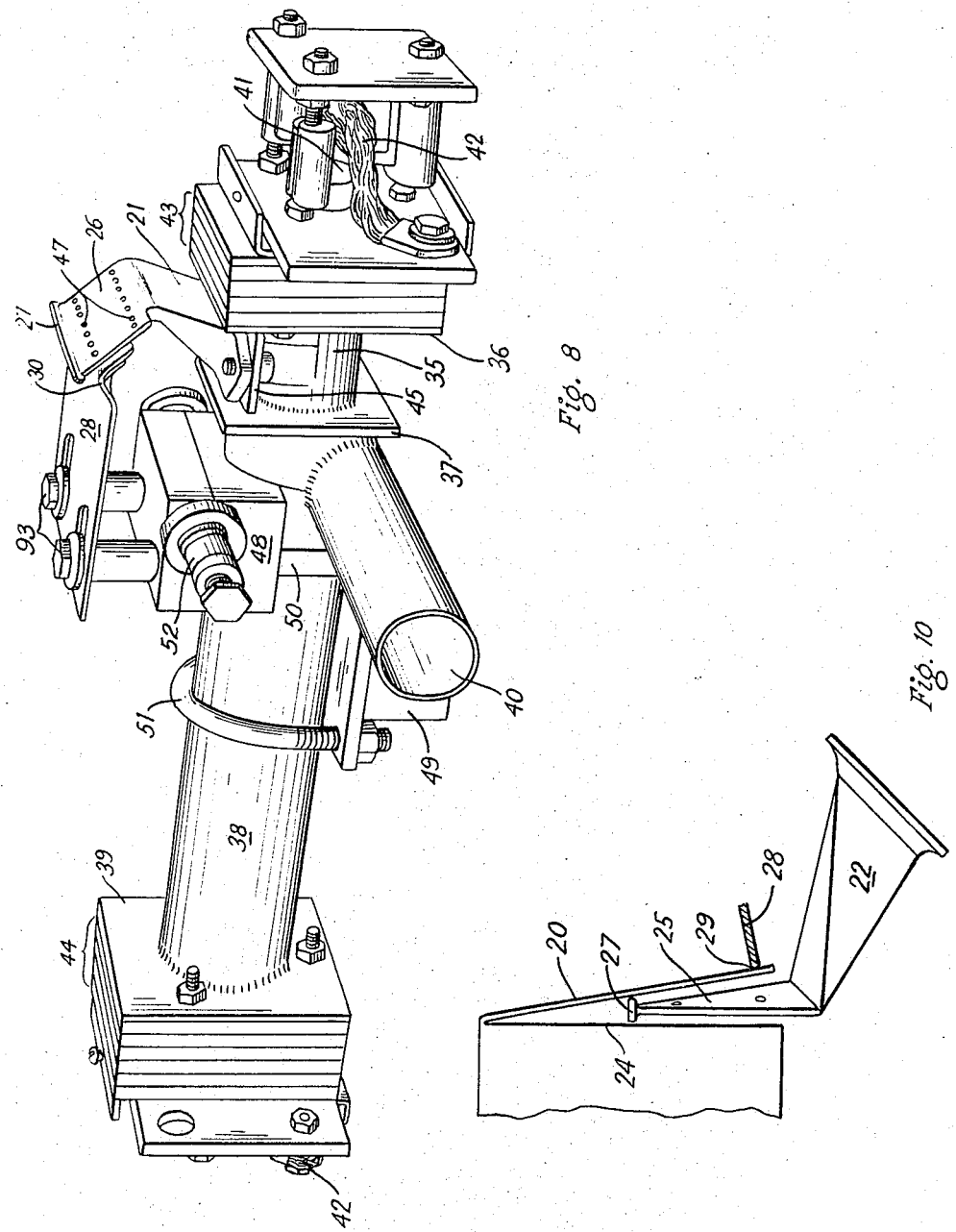

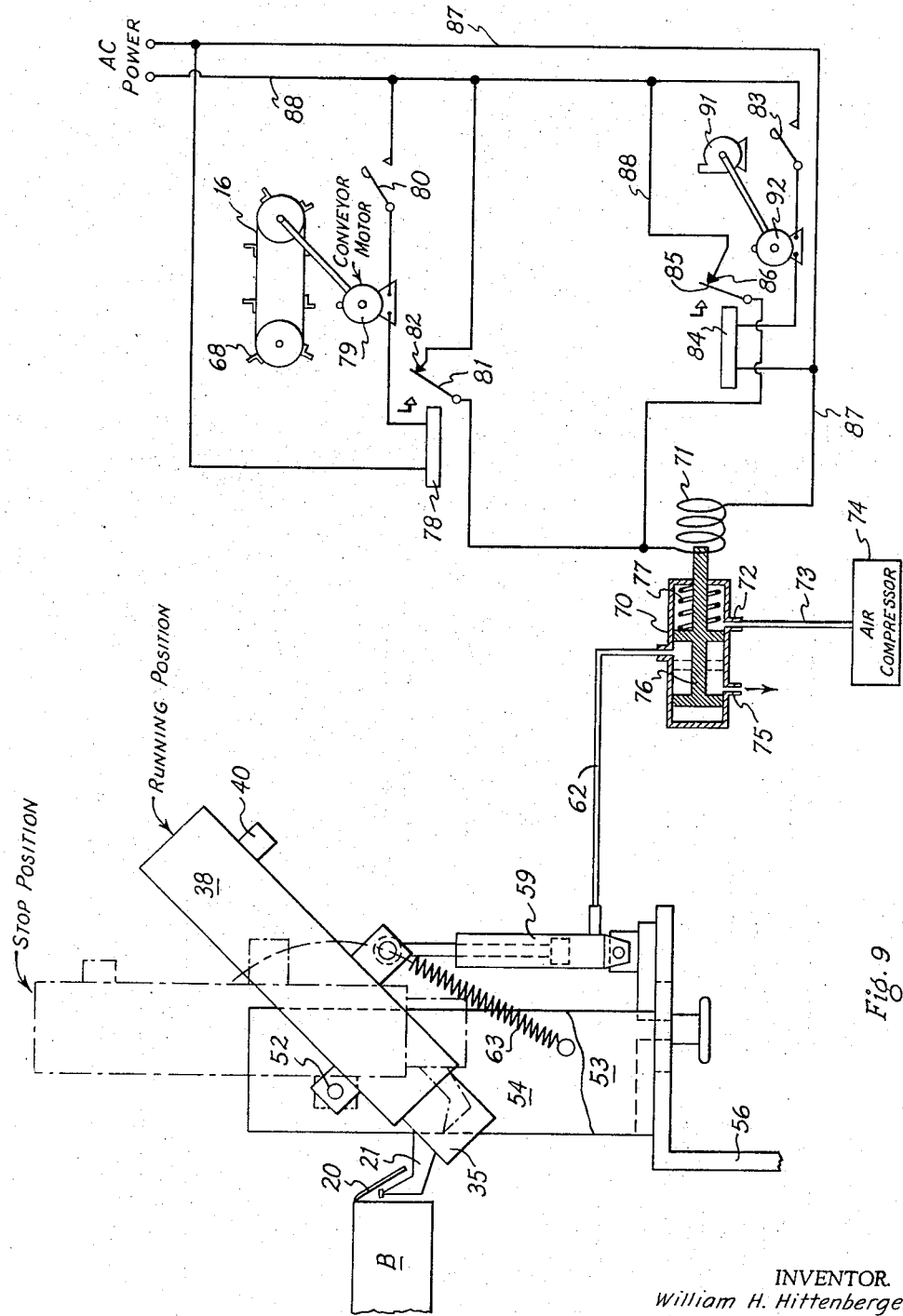

United States Patent Office 3,340,777
Patented Sept. 12, 1967

3,340,777
MACHINES FOR BONDING, BY HEAT AND PRESSURE, PANELS OF PAPERBOARD HAVING A THERMOPLASTIC COATING THEREON
William H. Hittenberger, Santa Clara, and Thomas R. Baker, Los Altos, Calif., assignors to Kliklok Corporation, New York, N.Y., a corporation of Delaware
Filed Feb. 25, 1965, Ser. No. 435,370
8 Claims. (Cl. 93—36)

This invention relates to machines for the bonding, by heat and a certain amount of pressure, of panels or flaps of folding box blanks of paperboard having a coating of a thermoplastic material thereon.

Machines of the aforementioned kind are principally used for two purposes, the erection of a folding box from an initially flat blank involving the bonding of flaps or panels for the purpose of maintaining the box in set-up condition, and the closing and sealing of a filled folding box involving generally the bonding of one or several box cover flaps to a wall or walls of the box body.

In the field of frozen food packaging paperboard boxes are favored which are coated on both sides with a thermoplastic coating. This coating may be composed of a wax composition having a high melting point. Such compositions are commercially available from practically all major oil refining companies and possess the property of imparting high moisture resistance and even liquid proofness to the board. These waxes may be applied with a high gloss finish which enhances the appearance of multicolor lithographic art work on the board.

Coatings of a synthetic resin base such as polyethylene coatings possess similar properties and are suitable for heat sealing.

These thermoplastic coatings are quite thin, but in spite of their thinness they are capable of forming a fiber tearing bond if they are appropriately handled.

In order to produce a bond the coating must of course be put in a condition of tackiness by application of heat. The copending patent application by William H. Hittenberger et al., Ser. No. 435,281 filed Feb. 25, 1965, discloses and claims a method of treating the respective panels or flaps of folding boxes in a particular manner in order to produce a reliable bond.

The present invention provides a machine capable of performing the aforesaid method and also other methods, and is capable of handling paper boxes whose blanks are thermoplastically precoated on both sides. The machine will also handle paper boxes of plain board having thermoplastic adhesive preapplied to certain specific surface portions. The present machine is capable of high production rates of the order of 200 to 300 boxes per minute and is capable of handling boxes in such a way that the exterior finish of the boxes remains unmarred.

The machine incorporating the present invention dispenses with the usual heat applicators which heat the board by contact with a heated element. This is a desirable improvement, as contact type heat applicators tend to collect thermoplastic adhesive from the surface to be bonded or coating material from the opposite board side.

The present machine also dispenses with the known heat applicators which operate by radiation and are therefore free from the disadvantage of collecting board surfacing material. However, the radiation type applicators heat the board proper and cause a certain amount of heat to be stored therein which must thereafter be dissipated before the bond becomes permanent. This requires cooling devices or a rather long-so-called compression section in which the box must remain until the adhesive has cooled below the solidification point. Such heat extracting devices are not required in the present improved machine which applies heat by means of a blast of high temperature compressed air. If the blast is made short enough no appreciable amount of heat is stored in the board itself.

It is recognized in this connection that the heating of folding box portions by heated air is basically known.

The invention however provides, among other details, improved mechanism permitting air of a high temperature exceeding the char point of the board to be used without damage to the board, even in the event of a mechanical stoppage, and permits the time of application of heat to be maintained so short that the board itself can serve as the cooling medium to dissipate the heat applied to the thermoplastic coating, i.e., the surface zone of the board only.

As a consequence, cooling means in the compression section of the machine may be dispensed with and the compression section may be kept relatively very short with respect to the number of boxes passing therethrough per time unit.

The various objects, features and advantages of this invention will appear more fully from the detailed description which follows accompanied by drawings showing, for the purpose of illustration, a preferred embodiment of the invention. The invention also resides in certain new and original features of construction and combination of elemets hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

FIG. 7 is a perspective downstream view of the machine portion of FIG. 6;

FIG. 8 is a perspective view of a heating unit removed from the machine;

FIG. 9 is a diagram illustrating the operation of the mechanism for interrupting application of heat; and FIG. 10 is a diagrammatic end view of a folding box and hot air applicator.

Figure 1:
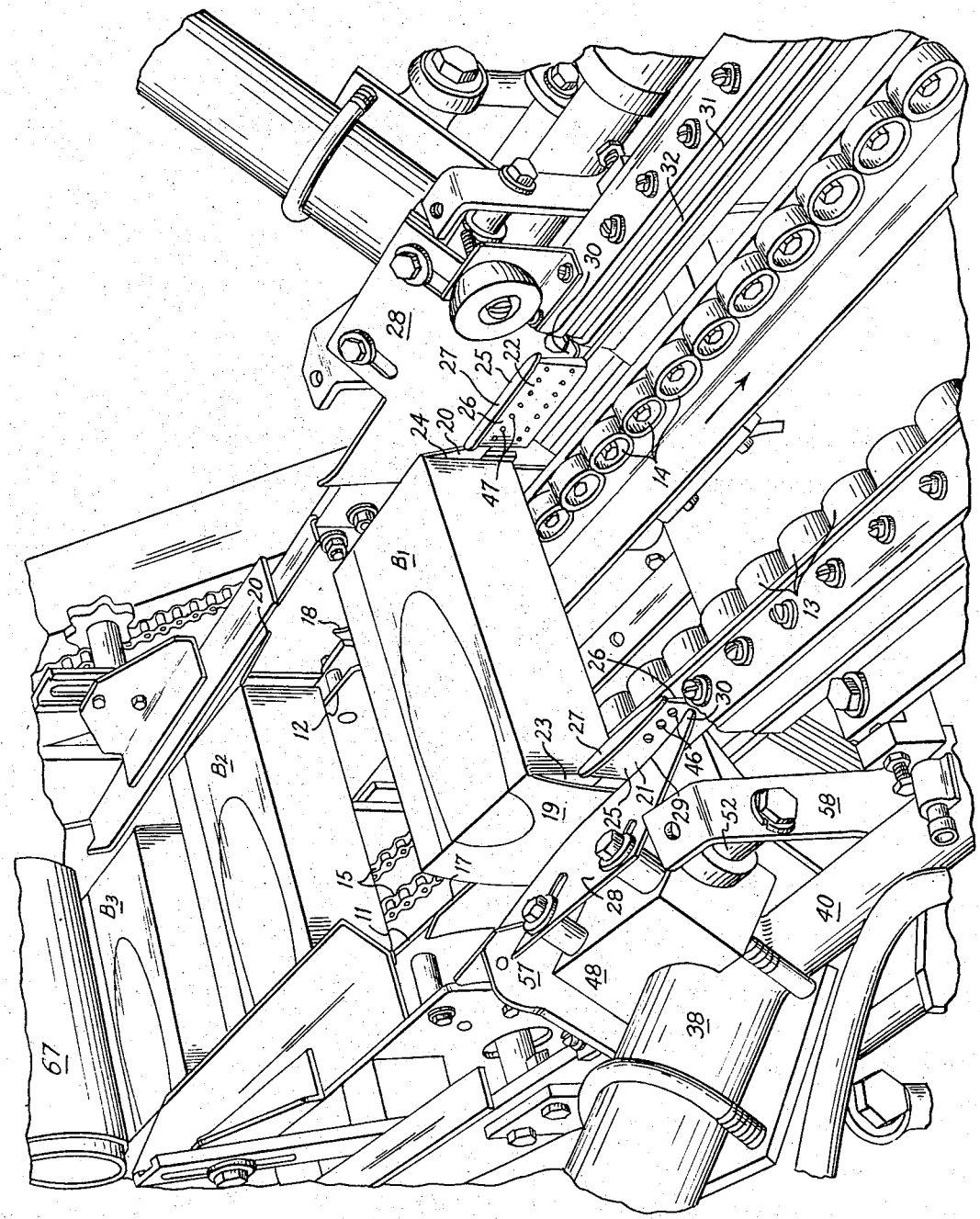
FIG. 1 is a perspective view of a portion of a folding box closing and sealing machine embodying the present invention, the view showing a box approaching the heating units.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be incorporated in other structural forms than shown.

FIG. 1 shows three boxes $B_1$, $B_2$ and $B_3$ on a straight line track, the far portion of which comprises spaced rails 11 and 12 and the near portion of which comprises two rows 13 and 14 of rollers on which the boxes move.

Within the far portion the boxes are advanced by a bottom conveyor chain 15 visible between boxes $B_1$ and $B_2$ and terminating at about that point. Within the roller section 13, 14 the boxes are preferably advanced by an overhead conveyor. This conveyor is not seen in FIGS. 1 to 5. It is so constructed that it may be swung out of the way to permit access to the boxes on the track in the event a box jam occurs. It was swung out of the way for the purpose of taking photographs of the track from which these drawings were traced.

Figure 4:
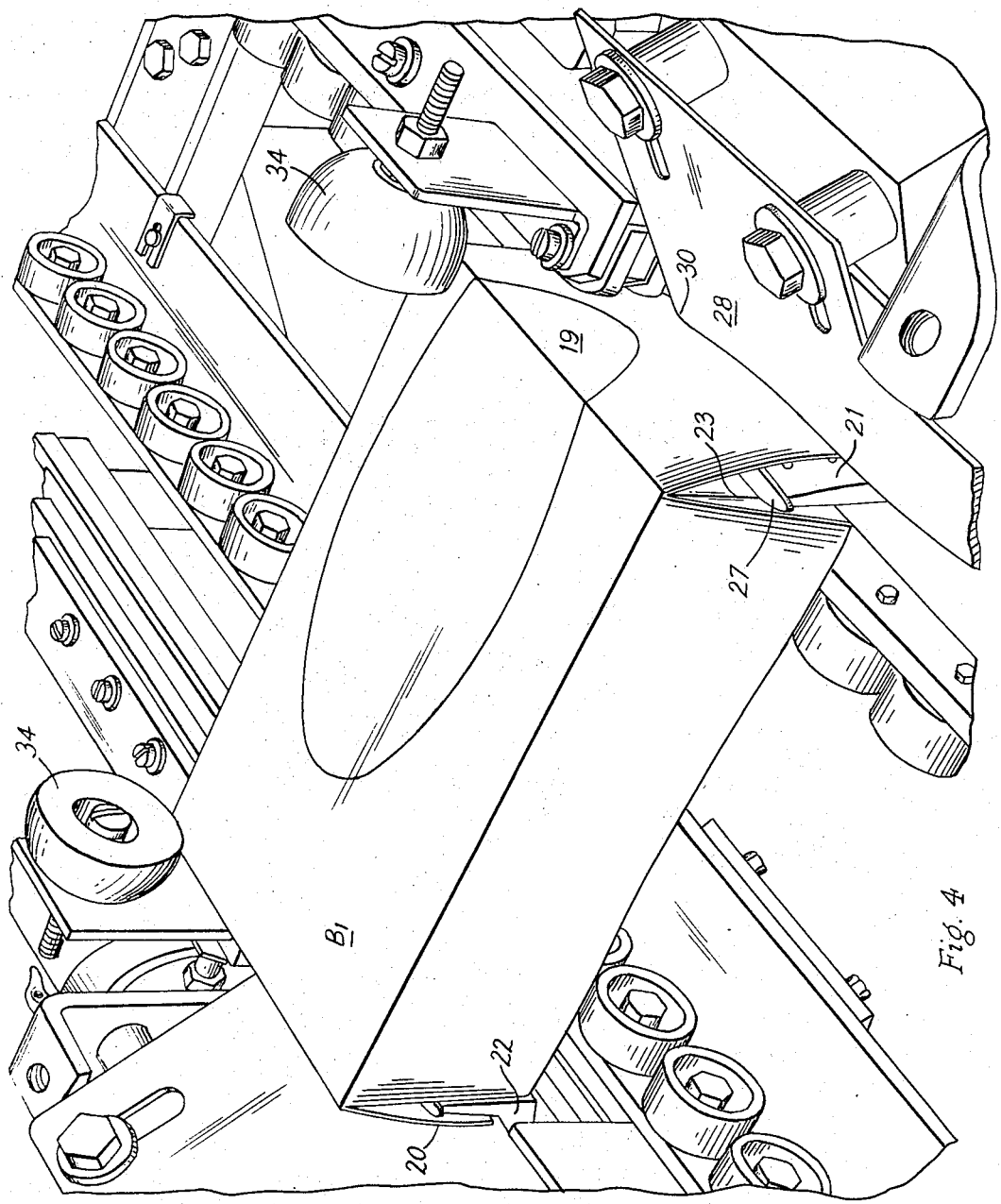
FIG. 4 is a close-up downstream view of the box which is about to enter the position in which the heated blank portions are brought into contact.
Figure 5:
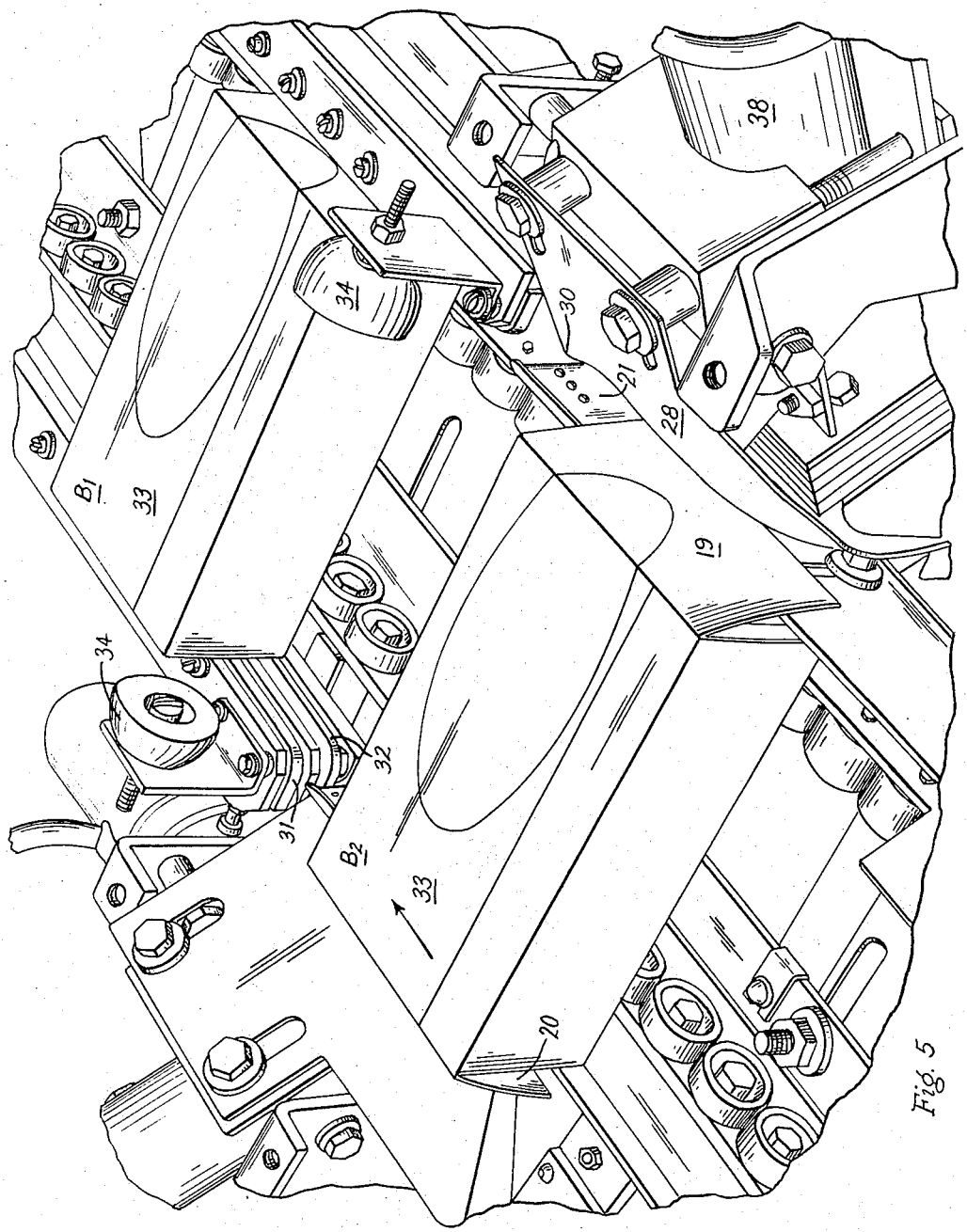
FIG. 5 is a downstream view showing the first box within the compression section of the machine and a second box entering the heating station.
Figure 6:
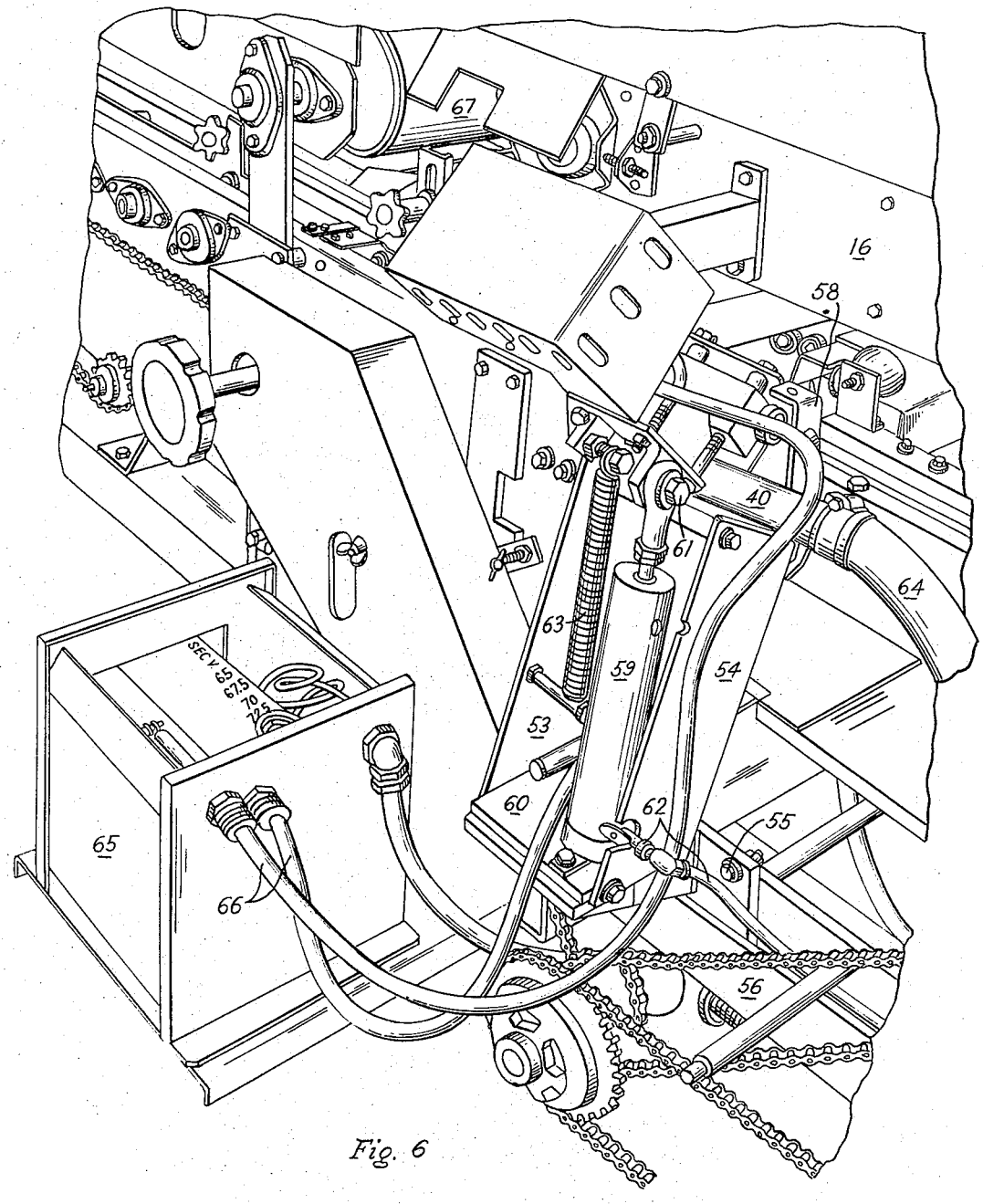
FIG. 6 is a perspective upstream view of the heating station showing the heating unit in operative position and also showing a portion of an overhead conveyor for advancing the boxes.

The overhead conveyor mechanism is shown in FIGS. 6 and 7, generally designated 16, and it is seen that it normally obscures the track portion shown in FIGS. 1 to 5 when swung down.

Figure 2:
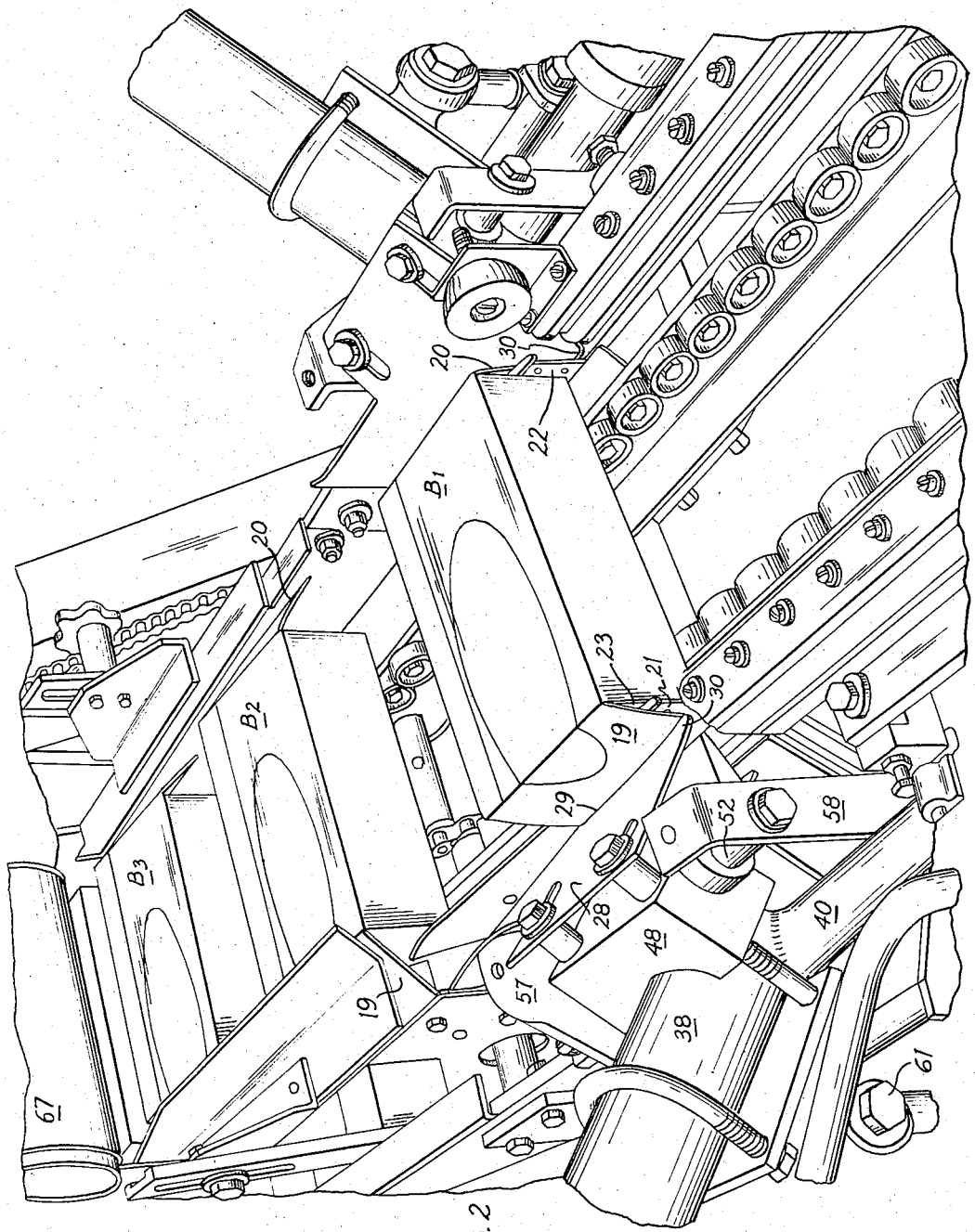
FIG. 2 shows the box in the position in which heat is being applied thereto.

Returning to FIG. 1, the boxes are laterally guided between plates or rails 17, 18 when entering the roller track portion, and the cover side flaps 19, 20 are flared out, as best seen in FIG. 2 at $B_2$. In the position in which box $B_1$ is shown in FIG. 1, the box approaches the discharge heads 21, 22 of hot air applicators. The heads are essentially hollow upright structures whose horizontal cross section resembles that of an airfoil. The vertical walls 25, 26 of the discharge heads have discharge apertures in them which discharge jets of heated air, preferably in a direction normal to the panel to be heated.

In the illustrated device the discharge apertures are in the form of rows of holes 46 and 47 directed towards the cover side flaps 19, 20 and against the box body walls 23, 24, respectively.

The illustrated boxes are formed from blanks coated on both sides with a thermoplastic material. The specific coating of the illustrated boxes was a high melting point wax applied in a thickness resulting from four pounds of wax per one thousand square feet of board (1817 grams per 92.9 square meters) on the inside and three pounds of wax per one thousand square feet of board on the outside (1363 grams per 92.9 square meters).

Such coatings are considered quite thin for bonding or sealing purposes, yet the illustrated machine is capable of producing a seal or bond sufficiently strong to tear fibers when opened.

The hot air applying unit including its heating portion will be described later with reference to FIG. 8 showing the entire unit. At this point it is sufficient to state that in operation the discharge head discharges jets of heated air through its discharge apertures. The air temperature lies above the char point of the board (the latter being of the order of 500 degrees F. (260 degrees C.)). A representative air temperature measured at a discharge hole is 900 degrees F. (480° C.).

The vertical walls 25, 26 of the discharge heads 21, 22 are topped by a fin or spacer element 27 protruding slightly beyond the vertical walls of the heads, a preferred dimension being one-sixteenth of an inch (1.6 mm.) (see also FIG. 10).

The fin 27 gears against the box wall 23 or 24 and the cover side flaps 19, 20 are urged in a direction towards the head by a guide element, a plate 28, having a contoured lower edge 29.

As clearly seen in FIG. 1, the edge 29 of the plate 28 and the outside wall 25 with the fin 27 thereon form a nip or gap into which the cover flap 19 moves. The terminal portion 30 of the plate 28 lies immediately adjacent the box body wall and forces the cover side flap into contact with the body wall.

In FIG. 2 the box $B_1$ is shown in a position in which its cover side flaps fully straddle the two air discharge heads 21, 22.

FIG. 4 shows the box $B_1$ slightly advanced with respect to the position shown in FIG. 2. At the illustrated moment the fin 27 emerges from the inverted V gap formed by the box wall 23 and the cover flap 19 at the trailing end of the box, while its leading end has moved beyond the portion 30 and has entered the compression section of the machine within which the cover flaps are pressed against the box body.

Turning to FIG. 5 for a moment, it is seen that the compression section comprises lateral rails or guides 31, 32 in the illustrated form of machine. These could be formed as movable belts, but it was found unnecessary to let the elements 31, 32 travel along with the boxes.

When entering between the lateral elements 31, 32 on either side, the box cover panel 33 moves under top rollers 34 which insure a level horizontal position of the cover panel. In FIGS. 1 and 2 one of the rollers was temporarily removed as it would have obscured the discharge head 21.

It is seen from FIGS. 4 and 5 that downfolding of the cover flaps into contact with the box walls follows immediately after the heat application. In normal operation of the machine the time gap between heating and folding-into-contact of the heated panels is a few hundredths of a second. In terms of physical dimension the folding-into-contact occurs within a distance from the end of the hot air applicator head less than the length of the head or fin.

As the application of heat is extremely brief, only the very surface of the board is heated, the time being too short for heat to penetrate the board during heat application. Since, therefore, the body of the paperboard remains relatively cool, it serves as heat sink during the compression period. The heat imparted to the thermoplastic coating disappears into the board, whereby the bond is quickly cooled to a point below the solidification of the coating.

Before turning to FIGS. 6 and 7 it may be well first to consider the general construction of the heat generator and hot air applicator. This device is shown in FIG. 8 and forms the subject matter of a separate patent application by William H. Hittenberger et al., Ser. No. 435,221, filed Feb. 25, 1965.

The device comprises, basically, a two-chamber heat exchanger through the axis, or center of which an electric heating element extends.

An inner cylindrical shell 35 having a terminal flange 36 on one end thereof extends through a flange 37 on one end of an outer cylindrical shell 38 approximately to the other end of the shell 38 to which a flange 39 is secured.

Two internal chambers result from this arrangement. An outer chamber is formed between the inner wall of the outer shell 38 and the outer wall of the inner shell 35. This outer chamber is accessible through a tangentially disposed inlet duct 40 through which compressed air is fed. As a consequence, the air travels along a helical path through the outer chamber towards the flange 39. About at the location of the flange sharp edged passages in the inner shell lead from the outer chamber to an inner chamber which is defined by the inside wall of the inner shell 35. An electrical resistance heating element or rod 41 extends centrally through the inner chamber and protrudes somewhat beyond the flanges 39 and 36 for a distance sufficient to provide space for an air seal at either end of the inner chamber and to permit conductor straps 42 or leads to be attached to the ends. Asbestos plates or discs 43, 44 form a part of the terminal air seals and conductor straps 42 are visible at both ends at 42.

The air which enters the inner chamber in a turbulent state through the internal passages near the flange 39 from the outer chamber leaves the inner chamber through a flanged nipple 45 after traveling the length of the inner chamber and being heated further in the process. The discharge head 21 is secured to the flanged nipple 45.

The outer shell 38 has two blocks 48 and 49 clamped thereto by bolts 50 (only one being visible) and by a V bolt 51. A pivot pin 52 extends through the block 48 and permits the entire unit to be pivotally mounted on the machine. The block 48 also carries the previously mentioned guide plate 28 on spacer bolts 93. The block 49 serves as a point for attachment to a device for tilting the hot air device, as will presently appear.

As seen in FIGS. 6 and 7, a pair of spaced mounting plates 53, 54 are fixedly secured at 55 to a base channel member 56 of the machine. The plates 53, 54 carry upright arms or brackets 57, 58 between which the pivot pin 52 of the hot air assembly is mounted (see also FIG. 1).

A pneumatic cylinder-and-piston type servo-motor 59 is mounted between the plates 53, 54 on a base plate 60, the end of the piston rod being attached to the block 49 of the hot air unit at 61. Compressed air admitted into the servo-motor 59 through an air line 62 causes its piston to move upwardly to tilt the hot air unit in a clockwise direction about the pivot 52. This tilting motion causes the discharge head 21 to move downwardly on an arc with respect to which the walls of the head are substantially tangentially disposed. The discharge head is thus withdrawn from the inverted V gap formed between the flap 19 and the box wall 23.

Figure 3:
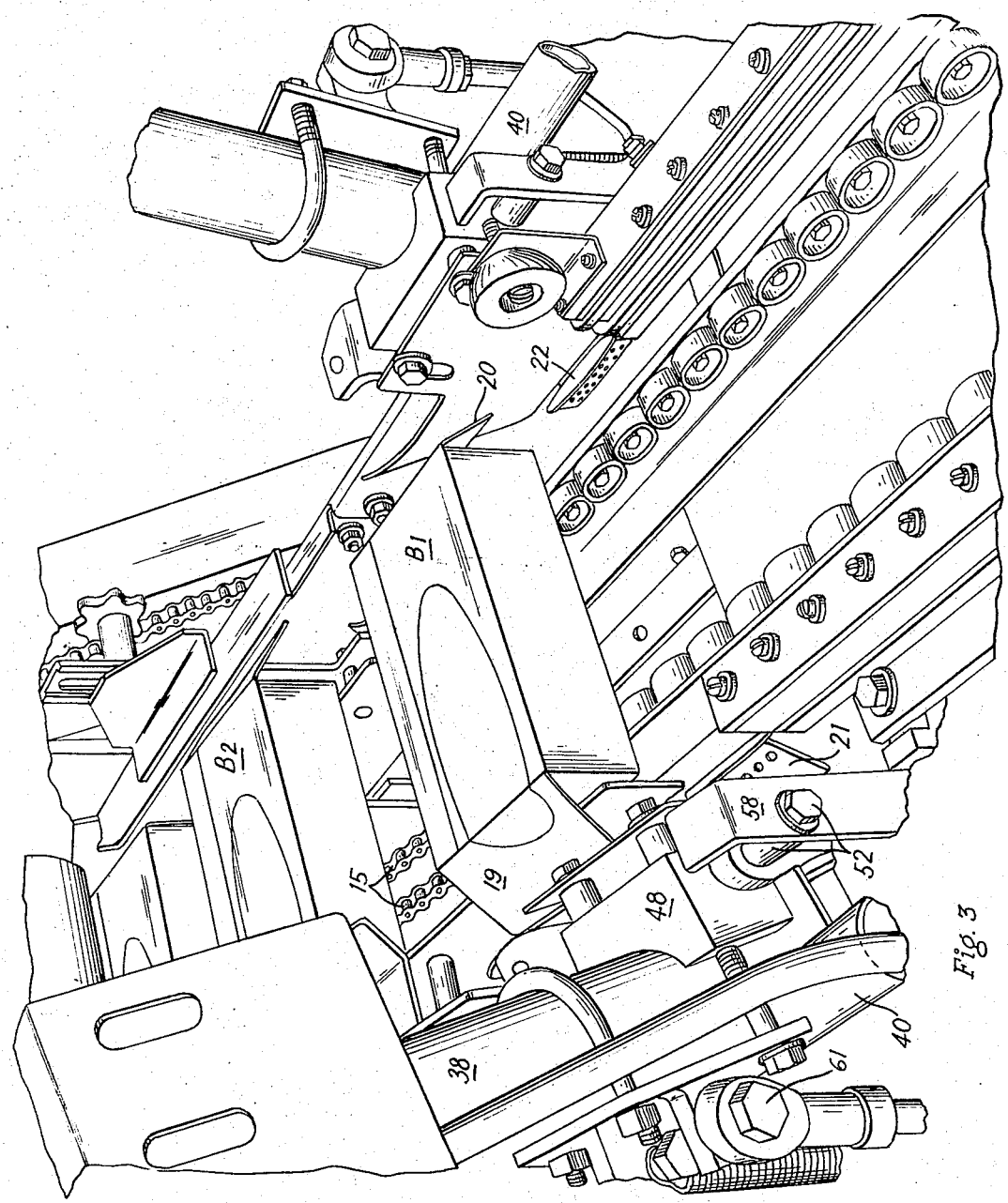
FIG. 3 shows the box in approximately the same position as in FIG. 2, the heating units being withdrawn, FIGS. 1 to 3 being views in the direction upstream with respect to the box motion.

FIG. 3 shows the discharge head in the withdrawn position. Hot air may continue to be discharged from the head 21 in this position without danger of charring the panels of a box on the box track. The extent of withdrawal is readily seen by comparing FIG. 3 with FIG. 1. In both figures the position of the box $B_1$ is the same.

Upon venting of the compressed air from the servo-motor 59, a spring 63 tilts the hot air unit back into its normal operative position.

Returning to FIG. 6, a flexible compressed air duct leads from the air inlet duct 40 to a multistage turbine type compressor which feeds an average of 20 gals. per minute (75 1/min.) of air to and through the assembly to be discharged by the head 21.

The power supply of the hot air assembly comprises a transformer from which cables 66 extend to the ends of the electric resistance rod. A representative power input of the heater is 4500 watts. For the purpose of convenient variation of the air temperature the transformer 65 is provided with a plurality of taps permitting the transformer output voltage to be varied in increments of 2.5 volts.

Near the upper left corner of FIG. 6 a belt-type conveyor 67 is seen which forms a part of a generally conventional box cover closer through which the boxes move with the cover hinge leading. The belt 67 is also visible in FIGS. 1 to 3.

The boxes then move into the grasp of the overhead conveyor 16 (FIG. 7) which comprises a vertically disposed endless conveyor chain fitted with L shaped lugs 68 for engaging the boxes. The two L shaped lugs 68 near the center of the figure engage the boxes beneath them along the box cover panel in order to hold the cover down, and along the trailing box wall over which a cover front flap is folded. The latter engagement advances the boxes.

The lug 68 farthest to the right is vacant and just beyond it a chain conveyor 69 is visible which carries the boxes farther to a device which turns the boxes about a vertical axis prior to performance of a sealing operation on the corner front flap. That operation corresponds in all particulars to the previously described sealing procedure of the cover side flaps and need therefore not be described.

The overhead conveyor begins approximately at the left boundary of the illustration and the L shaped lug farthest to the left is on its way down and still slightly tilted prior to coming to rest on the box beneath it. This box is in about the position of the box $B_2$ in FIG. 1.

FIG. 9 shows a simplified diagram illustrating the essentials of the machine control. The air line 62 leads from the servo-motor 59 to a control valve 70 actuated by a solenoid 71. The valve 70 has an inlet 72 from which a line 73 leads to a source of compressed air 74. The valve further comprises an exhaust port 75. The valve member 76 is loaded by a spring 77 which normally keeps the valve member in the vent position, as shown.

When the solenoid is energized it pulls the valve member 76 to the right, whereupon compressed air flows to the servo-motor 59 which then tilts the hot air assembly from the normal operating position shown in solid lines into the inoperative position shown in broken lines in which the discharge head is withdrawn from the box B.

When the solenoid 71 is deenergized the valve member 76 shifts to the left, the servo-motor 59 is vented and its spring 63 moves the hot air assembly back into heat applying position.

The solenoid is energized whenever one of two conditions occur: (1) stoppage of the conveyor, as a result of which boxes within the hot air blast would become scorched or would possibly burn; (2) stoppage of the air supply to the hot assembly, as a result of which its heating element would burn out.

In order to effect this control two relays are provided. The winding of relay 78 lies in the circuit of the conveyor motor 79. The conveyor motor is started and stopped by a switch 80. When the switch 80 is closed, the motor 79 starts and drives the overhead conveyor 16. At the same time the relay winding 78 is energized the relay pulls up its armature 81 and breaks the contact 81, 82. This opens the solenoid circuit and the control valve 70 remains in the position in which it is shown.

The turbine 91 which supplies compressed air to the hot air assembly duct 40 is driven by a motor 92. The motor is controlled by a switch 83 which, when closed, starts the motor 92 and energizes the winding 84 of a relay. The relay then pulls up its armature 85 and breaks the contact 85, 86.

The solenoid is connected to the power supply through the lead 87 and is energized when either of the two relays drops its armature. A circuit is then completed from the solenoid through the respective relay break contact to the second lead 88 of the power supply. This occurs when either the circuit of the conveyor motor 79 is interrupted or when the motor 92 driving the air turbine comes to a stop. Such interruption of the motor drives may occur as a result of overload, conveyor jamming, or the like, which, in turn, causes an overload breaker switch within the respective motor to open the circuit. Such overload breakers are conventionally provided in motors and need for this reason not be described.

What is claimed is:

1. A device for bonding two panels of paperboard of a folding box having a thermoplastic coating on both of the surfaces to be bonded, one panel being hingedly foldable with respect to the other about a hinge axis lying substantially in the plane of the other panel, the device comprising, a conveyor for moving the box in the direction of the plane of the panels; means for folding one panel relatively to the other into a V position upstream of the discharge head hereinafter recited; a discharge head along the path of the conveyor in a position in which the head is straddled by the V formed by the panels, said head having discharge apertures for discharging jets of air in a direction substantially normal to the surface of the panels moving past the head, said head having a certain length as measured along the conveyor path; folding means downstream with respect to said head so arranged as to fold any portion of said panels into contact with the respective other panel at a distance from the said head less than said length; and means for supplying heated air to said head.

2. A device for bonding two panels of paperboard of a folding box having a thermoplastic coating on both of the surfaces to be bonded, one panel being hingedly foldable with respect to the other about a hinge axis lying substantially in the plane of the other panel, the device comprising, a conveyor for moving the box in the direction of the plane of the panels; means for folding one panel relatively to the other into a V position upstream of the discharge head hereinafter recited; a discharge head along the path of the conveyor in a position in which the head is straddled by the V formed by the panels, said head comprising two opposite walls converging in the direction of the apex of the V, both said walls having air discharge passages in them, and a spacer fin in the direction of travel of the boxes, said fin being adjacent the portion of greatest proximity of said opposite walls and having a width greater than the spacing of the walls at said portion in order to space the box panels to a position in which they are out of contact with the said walls, said fin having a predetermined length as measured along the conveyor path; folding means downstream with respect to said head so arranged as to fold any portion of said panels into contact with the respective other panel at a distance from the said head less than said length; and means for supplying heated air to said head.

3. A device for bonding two panels of paperboard of a folding box having a thermoplastic coating on both of the surfaces to be bonded, one panel being hingedly foldable with respect to the other about a hinge axis lying substantially in the plane of the other panel, the device comprising, a conveyor for moving the box in the direction of the plane of the panels; means for folding one panel relatively to the other into a V position upstream of the discharge head hereinafter recited; a discharge head along the path of the conveyor in a position in which the head is straddled by the V formed by the panels, said head comprising two opposite doubly converging walls, said walls converging firstly in the direction of the apex of the V and secondly in the direction of travel of the boxes, both said walls having air discharge passages in them, and a spacer fin in the direction of travel of the boxes, said fin being adjacent the portion of greatest proximity of said walls and substantially parallel to said hinge axis, said fin having a width greater than the spacing of the walls at said portion in order to space the box panels from said walls, the width of said fin diminishing in the direction of the box travel and having a predetermined length as measured along the conveyor path; folding means downstream with respect to said head so arranged as to fold any portion of said panels into contact with the respective other panel at a distance from the said head less than said length; and means for supplying heated air to said head.

4. A device for bonding two panels of paperboard of a folding box having a thermoplastic coating on both of the surfaces to be bonded, one panel being hingedly foldable with respect to the other about a hinge axis lying substantially in the plane of the other panel, the device comprising, a conveyor for moving the box in the direction of the plane of the panels; means for folding one panel relatively to the other into a V position upstream of the discharge head hereinafter recited; a discharge head along the path of the conveyor in a position in which the head is straddled by the V formed by the panels, said head comprising two opposite walls having air discharge passages therethrough; means for mounting said head along said conveyor, said mounting means supporting said head for tilting movement into an operative position in which the head is straddled by the V formed by said panels and an inoperative position in which it is withdrawn from the operative position on an arcuate path to which said walls are substantially tangentially disposed; folding means downstream with respect to said head; means for supplying heated air to said head; means for driving said conveyor; and power means responsive to the conditions of running and stopping, respectively, of said conveyor for tilting said head into its operative and its inoperative position, respectively.

5. A device for bonding two panels of paperboard of a folding box having a thermoplastic coating on both of the surfaces to be bonded, one panel being hingedly foldable with respect to the other about a hinge axis lying substantialy in the plane of the other panel, the device comprising, a conveyor for moving the box in the direction of the plane of the panels; means for folding one panel relatively to the other into a V position upstream of the discharge head hereinafter recited; a discharge head along the path of the conveyor in a position in which the head is straddled by the V formed by the panels, said head comprising two opposite walls having air discharge passages therethrough; means for mounting said head along said conveyor, said mounting means supporting said head for tilting movement into an operative position in which the head is straddled by the V formed by said panels and an inoperative position in which it is withdrawn from the operative position on an arcuate path to which said walls are substantially tangentially disposed, said head having a certain length as measured along said conveyor path; folding means downstream with respect to said head so arranged as to fold any portion of said panels into contact with the respective other panel at a distance from the end of the head less than said length; means for supplying heated air to said head; means for driving said conveyor; and power means responsive to the conditions of running and stopping, respectively, of said conveyor for tilting said head into its operative and its inoperative position, respectively.

6. A device for bonding the flap of a folding box cover having a thermoplastic coating on the inside to the wall of the box body having a thermoplastic coating on the outside, said flap being hingedly foldable with respect to said wall so as to form an inverted V gap therebetween, which gap is closed by the bonding operation, the device comprising in combination, a conveyor for moving the box in the direction of the plane of the said wall and flap; an air discharge head along the path of the conveyor in in a position in which the head extends into said V gap, said head having discharge apertures in it for discharging air against said flap and said wall, respectively; a guide element fixed with respect to said head for grasping the flap of a box between the guide element and the head and urging the flap against the head; means responsive to the conditions of running and stopping of said conveyor for moving said head into, and withdrawing said head from, said V gap, respectively; and means for supplying heated air to said head.

7. A device for bonding the flap of a folding box cover having a thermoplastic coating on the inside to the wall of the box body having a thermoplastic coating on the outside, said flap being hingedly foldable with respect to said wall so as to form an inverted V gap therebetween, which gap is closed by the bonding operation, the device comprising, in combination, a conveyor for moving the box in the direction of the plane of the said wall and flap; an air discharge head along the path of the conveyor in a position in which the head extends into said V gap, said head having discharge apertures in it for discharging air against said flap and said wall, respectively; a guide element fixed with respect to said head and forming a nip therewith into which said flap passes as the box is being advanced by said conveyor, the nip becoming increasingly narrower in the direction of conveyor movement, said guide element extending beyond said head to a point downstream with respect to said head at which the gap between said flap and wall is substantially closed; and means for suplying heated air to said head.

8. A device for bonding the flap of a folding box cover having a thermoplastic coating on the inside to the wall of the box body having a thermoplastic coating on the outside, said flap being hingedly foldable with respect to said wall so as to form an inverted V gap therebetween, which gap is closed by the bonding operation, the device comprising, in combination, a conveyor for moving the box in the direction of the plane of the said wall and flap; an air discharge head along the path of the conveyor in a position in which the head extends into said V gap, said head comprising two opposite walls curved substantially like an air foil and being oriented in the direction of advance of the boxes, said head having discharge apertures in its walls for discharging air against said flap and the box wall, respectively, said head further comprising rib means protruding above the apertured head walls so as to space the box wall and flap therefrom; a guide element alongside said head and forming a nip therewith into which nip the box flap passes, the nip becoming increasingly narrower in the direction of conveyor movement, said element extending beyond said head to a point downstream with respect to said head at which the gap between said flap and wall is substantially closed; and means for supplying heated air to said head.

References Cited
UNITED STATES PATENTS 2,379,920   7/1945   Peters.
2,874,619   2/1959   Phin _____ 53—375 X BERNARD STICKNEY, *Primary Examiner*